United States Patent
Yao et al.

(10) Patent No.: US 9,361,510 B2
(45) Date of Patent: Jun. 7, 2016

(54) EFFICIENT FACIAL LANDMARK TRACKING USING ONLINE SHAPE REGRESSION METHOD

(71) Applicant: Intel Corporation, Santa Clara, CA (US)

(72) Inventors: Anbang Yao, Beijing (CN); Yangzhou Du, Beijing (CN); Xiaofeng Tong, Beijing (CN); Tao Wang, Beijing (CN); Yurong Chen, Beijing (CN); Jianguo Li, Beijing (CN); Jianbo Ye, Beijing (CN); Wenlong Li, Beijing (CN); Yimin Zhang, Beijing (CN)

(73) Assignee: Intel Corporation, Santa Clara, CA (US)

(*) Notice: Subject to any disclaimer, the term of this patent is extended or adjusted under 35 U.S.C. 154(b) by 236 days.

(21) Appl. No.: 14/106,134

(22) Filed: Dec. 13, 2013

(65) Prior Publication Data

US 2015/0169938 A1    Jun. 18, 2015

(51) Int. Cl.
*G06K 9/00* (2006.01)
*G06K 9/62* (2006.01)

(52) U.S. Cl.
CPC ........ *G06K 9/00261* (2013.01); *G06K 9/00281* (2013.01); *G06K 9/00315* (2013.01); *G06K 9/6207* (2013.01)

(58) Field of Classification Search
CPC .......... G06K 9/00228; G06K 9/00268; G06K 9/00288
See application file for complete search history.

(56) References Cited

U.S. PATENT DOCUMENTS

| 2004/0170305 A1* | 9/2004 | Kim | G06K 9/00281 382/118 |
|---|---|---|---|
| 2008/0187213 A1* | 8/2008 | Zhang | G06K 9/00281 382/159 |
| 2010/0202697 A1* | 8/2010 | Matsuzaka | G06K 9/621 382/190 |
| 2013/0216136 A1* | 8/2013 | Kita | G06K 9/46 382/195 |
| 2014/0185924 A1* | 7/2014 | Cao | G06K 9/00248 382/159 |

FOREIGN PATENT DOCUMENTS

| KR | 1020100025862 A | 3/2010 |
| KR | 1020120006610 A | 1/2012 |
| WO | WO-2015089436 A1 | 6/2015 |

OTHER PUBLICATIONS

"International Application Serial No. PCT/US2014/070083, International Search Report mailed Mar. 16, 2015", 4 pgs.
"International Application Serial No. PCT/US2014/070083, Written Opinion mailed Mar. 16, 2015", 8 pgs.
Beeler, Thabo, et al., "High-quality passive facial performance capture using anchor frames", ACM Transactions on Graphics (TOG)—Proceedings of ACM SIGGRAPH 2011, vol. 30, Issue 4, (Jul. 2011), 10 pgs.
Bosch, A., et al., "Image Classification using Random Forests and Ferns", IEEE 11th International Conference on Computer Vision, 2007. ICCV 2007., (Oct. 14-21, 2007), 1-8.

(Continued)

*Primary Examiner* — Stephen R Koziol
*Assistant Examiner* — Pinalben Patel
(74) *Attorney, Agent, or Firm* — Schwegman Lundberg & Woessner, P.A.

(57) ABSTRACT

Disclosed in some examples are various modifications to the shape regression technique for use in real-time applications, and methods, systems, and machine readable mediums which utilize the resulting facial landmark tracking methods.

22 Claims, 9 Drawing Sheets

(56) References Cited

OTHER PUBLICATIONS

Cao, Xudong, et al., "Face Alignment by Explicit Shape Regression", CVPR, (2012), 8 pgs.

Chen, Cao, et al., "3D shape regression for real-time facial animation", In: ACM Transactions on Graphics (TOG)—SIGGRAPH Conference Proceedings, vol. 32, Issue 4, (Jul. 2013), 10 pgs.

* cited by examiner

EFFICIENT FACIAL LANDMARK TRACKING USING ONLINE SHAPE REGRESSION METHOD

TECHNICAL FIELD

Embodiments pertain to facial landmark tracking. Some embodiments relate to facial landmark tracking using online shape regression.

BACKGROUND

Accurately identifying positions of facial landmarks (e.g., on eyes, nose, mouth, or chin) is important for facial expression recognition, facial tracking, 3D modeling, and the like. For example, a video avatar chat program may use animated "avatars" that are computerized characters that mimic the facial movements of the chat participants. If the person in the chat moves their head to the right, the avatar's head moves to the right. An avatar may be defined as an icon or figure representing a particular person in computer games, Internet forums, video chats, and the like. These avatar chat programs utilize facial landmark detection to extract features of a person's face and then use that data to animate the avatar.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
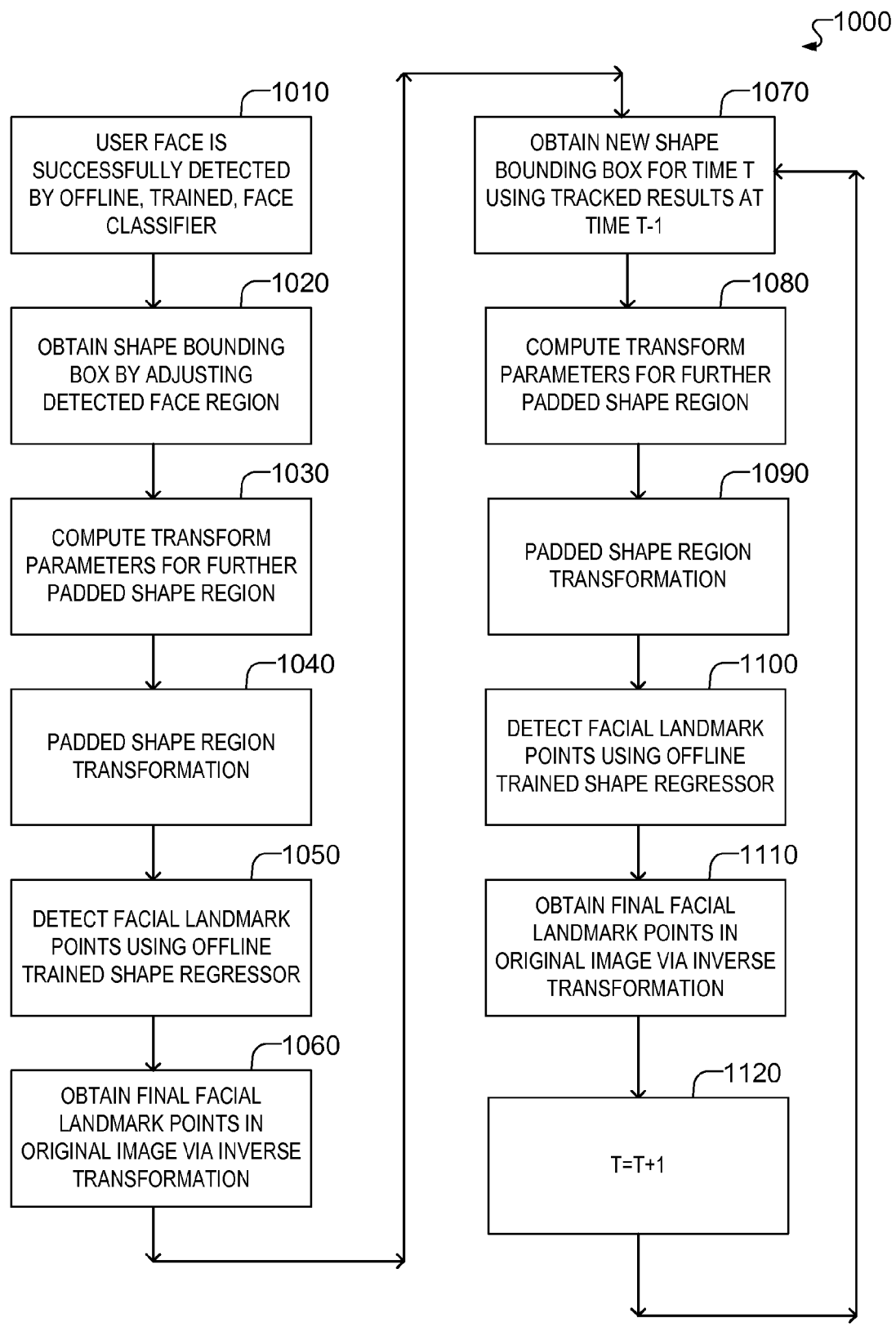
FIG. 1 is a flowchart of a method according to some examples of the present disclosure of utilizing shape regression techniques in real time applications.

One method for facial landmark detection may include an "explicit shape regression" technique described in the paper "Face Alignment by Explicit Shape Regression" by Xudong Cao, Yichen Wei, Fang Wen, and Jian Sun, 2012 IEEE Conference on Computer Vision and Pattern Recognition (CVPR). In sum, the explicit shape regression approach uses a two-level cascaded approach to incrementally update facial shape estimation in a coarse-to-fine fashion. The final regressor containing a set of primitive regressors and is learned by explicitly minimizing the alignment error over training data in a holistic manner—all facial landmarks are regressed jointly in a vectorial output. To train each vectorial primitive regressor, a fern is used to divide feature space of training data. For efficiency, a Shape Indexed Image Feature (SIIF) is used in the fern. Once a shape regressor is trained, given a new image of a face (where face bounding box is known) and initial facial shape (e.g., the mean shape over training data), the final shape can be calculated by summing up initial facial shape and each shape increment sequentially obtained from looking up respective primitive regressor.

The explicit shape regression method described above is only practically applied to static images in which facial shape bounding boxes are available (e.g., by manual labeling). These drawbacks prevent the method's direct use in handling real-time facial landmark point tracking which is essential in video applications such as an avatar video chat. Additionally, the method has problems in that when training facial shape increments in each primitive regressor, the alignment error associated with training samples falling in one specific bin of a fern (a composition of F features and respective thresholds—where F=5 in the original shape regression method) directly acts on the whole facial shape updating without considering that a fern usually only correlates with a limited portion of facial landmark points in a facial shape. A fern performs a binary partition of training data with respect to each feature and the corresponding threshold. That is, using a fern on a large training dataset (e.g., tens of thousands of samples) will only obtain coarse, but not dense, division of feature space. These drawbacks limit the applicability of the method to many applications.

Disclosed are various modifications to the shape regression technique for use in real-time applications, and methods, systems, and machine readable mediums which utilize the resulting facial landmark tracking methods.

Using Shape Regression in Real-Time Tracking Scenarios

Disclosed in some examples are methods, systems, and machine readable mediums which utilize geometric and temporal cues in a combined way to make the above described shape regression algorithm applicable to real-time tracking scenarios. In some examples, the user's facial region is initially detected using an offline trained facial classifier during an initial step. After adjusting the detected facial region with respect to the spatial layout structure of facial landmark points, geometric and temporal cues may be jointly used to enable the offline trained shape regressor capable of online, real-time tracking of facial landmark points. Example improvements to the offline trained shape regressor include: detecting a user's facial region by using an offline trained face classifier and then further modifying the facial region according to the spatial layout structure of facial landmark points; Using geometric and temporal cues to guarantee accurate tracking of facial landmark points in continuous frames; running an offline trained shape regressor in a transformed facial shape space, and back transforming the results to original image space; directly inferring the compact facial shape region at time T from the tracked facial landmark points at time T−1 and using the starting values of offline trained shape regressor at time T as the mean positions of facial landmark points over the training data.

Turning now to FIG. 1, a flowchart of a method 1000 according to some examples of the present disclosure of utilizing shape regression techniques in real time applications is shown. At operation 1010, an offline, trained, face classifier is repeatedly run until it successfully detects a user face appearing in the image. Example face classifiers trained from boosting algorithms include face classifiers available from the Open Source Computer Vision Library (Opencv). For example, "haarcascade_frontalface_alt.xml" and "haarcascade_profileface.xml". The face classifier outputs a bounding box that represents the location of the face. Since the detected facial region does not have the same geometric structure to that of a normalized facial shape (e.g., it may be scaled, rotated, tilted, partially obstructed, or the like), direct use of the offline trained shape regressor may not obtain an accurate detection of facial landmark points. Given a face classifier and a shape regressor, a fixed adjustment on the size of the detected face region is performed by making a statistical correspondence between their geometric structures. To that end, at operation 1020, the shape bounding box is obtained by adjusting the detected face region to pad the detected region to ensure we capture the entire face. At operation 1030, a transform is computed to normalize the face in the shape bounding box to account for changes in size, and rotation. At operation 1040, the un-normalized facial region is normalized using the computed transform. Once the face is normalized, at operation 1050, the facial landmarks are computed on the normalized shape using the offline shape regressor. At operation 1060, the landmark points in the original image are obtained by performing an inverse transformation on the facial landmark points output from the offline shape regressor.

When facial shape initialization is done, the detected facial landmark point positions are then used to compute a new shape bounding box in the next frame. The concept is that since the slowest frame rate of video is around 20 frames per second, that facial motion over $1/20^{th}$ of a second is low, so the position of facial landmarks and the facial bounding box from one frame to the next will be close. At operation 1070, the new shape bounding box is computing using the tracked results at time T−1. This procedure similarly repeats in the following frames as shown in the right part of FIG. 1 (operations 1070-1110). The new shape bounding box in frame at time T is computed as the minimum frontal circumscribed rectangle of the tracked facial landmark points in frame at time T−1. The shape of the bounding box is expanded with the same padding ratio used to crop facial shape samples when training the shape regressor. At operation 1080, the transform parameters are again calculated to factor in the scaling, rotation, and size of the face. At operation 1090, the padded shape region is transformed according to the transformation parameters to produce a normalized face. For example, it is scaled to have the same size to that of the normalized facial shape samples. The offline trained shape regressor is then used at operation 1100 on the transformed shape region to detect facial landmark points in that region. In some examples, the mean facial landmark point positions as calculated over the training data are used as the starting values for the offline trained shape regressor for the frame at time T. This suppresses possible error accumulation and outburst drift occurring when using tracked facial landmark points in frame at time T−1 as the starting values. The final landmark point positions in frame at time T are obtained by inverse transformation of the detected results in scaled shape region at operation 1110.

In the frame at time T, let $(W_p, H_p)$ and $(W_n, H_n)$ denote the width and height of the padded shape region $S_p$ and normalized facial shape $S_n$, respectively, the scaling factor s is computed as $$s = \min\left(\frac{Wn}{Wp}, \frac{Hn}{Hp}\right)$$

Let $(cx_p, cy_p)$ and $(cx_t, cy_t)$ be the coordinates of the centers of $S_p$ and transformed $S_p$, respectively, let $(px_t, py_t)$ be the detected coordinates of a landmark point in the transformed $S_p$, the corresponding coordinates $(px_p, py_p)$ in $S_p$ are computed as:

$$px_p = \frac{(px_t - cx_t)}{s} + cx_p$$

$$py_p = \frac{(py_t - cy_t)}{s} + cy_p$$

In other examples, a less accurate, but more straightforward approach may be utilized in which the offline trained shape regressor is run in a padded shape region via an inverse transformation.

The operations at 1070-1110 may then be repeated for subsequent frames at time T by incrementing T to the next frame at operation 1120 and then repeating operations 1070-1110 until the facial landmark tracking is complete.

Figure 2:
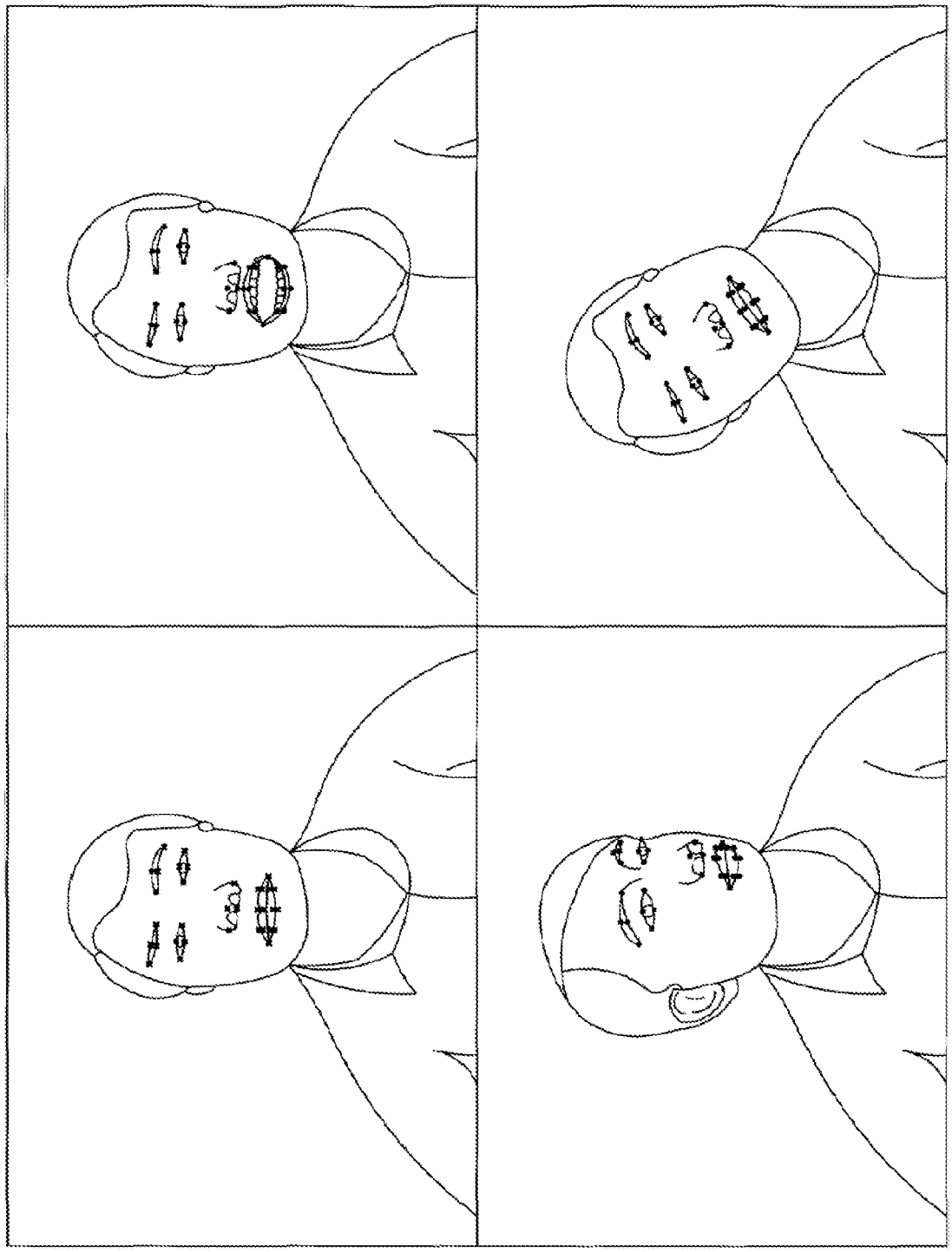
FIG. 2 shows line drawings of representative tracking results according to some examples of the present disclosure.

In some examples, the shape regression tracker uses a thirty-four point shape regressor. This tracker has been extensively tested both under diverse real-time scenarios and on a large number of recorded video data. Its performance is extraordinary good. It can well handle common facial expressions (e.g., smile and surprise), large pose variations (e.g., about [−30, +30] degree yaw, [−15, 30] degree pitch, and [−15, +15] degree roll) and other challenging scenarios such as wearing glasses. FIG. 2 shows line drawings of representative tracking results according to some examples of the present disclosure. These line drawings approximate screen shots of a face, overlaid with the detected tracking points. In FIG. 2, the initially detected facial landmark points are shown as "X" marks, while the tracked results are shown as dots.

Facial Component Based Filtering for Online Shape Regression

Although the method disclosed above can track facial landmark points in challenging scenarios, the results in two consecutive frames may show slight jitter when a face object undergoes minor expression or pose changes. Some facial landmark points may also temporarily drift when they are partially occluded (mainly due to large pose variations). As a result, the animation interaction may be less than ideal which may decrease the quality of user experience during such applications as an avatar video chat.

Disclosed in some examples are systems, machine readable mediums, and methods for reducing this jitter. The system uses a facial component based filtering method that recursively merges the results of the previously disclosed online shape regression algorithm in the current frame (at time T) and the previous frame (at time T−1) through an importance-driven filtering procedure. In the method, the facial shape is divided into several component groups whose facial landmark points are smoothed separately via measuring their geometric similarities between two continuous frames. This method shows favorable capacity to suppress slight jitter and temporary drift, and lays a solid base for achieving sufficiently stable animation interaction in facial landmarking applications.

In particular, this method divides facial components into different groups with respect to spatial correlation and tracking stability. When filtering tracked results of each group, it utilizes the geometric similarities between the tracked facial landmark point positions in two continuous frames to achieve an importance-driven filtering. With these methods, sufficiently stable facial landmark point tracking may be consistently provided.

Commonly used filtering methods such as median filter and average filter usually use the information contained in a set of previous and following frames (generally, it is not a trivial task to make precise predications). However, the disclosed method only uses the information contained in the two most correlated frames (referred to as the current frame at time T and the previous frame at time T−1), thus it needs no predication. In a sharp contrast to available filtering methods which process facial landmark points all together, facial landmark points in the disclosed method are divided into several groups and the geometric similarities between the tracked facial landmark point positions in two continuous frames are used to achieve more robust filtering. This method will serve as an indispensable module of improved facial landmarking approaches, such as an improved avatar video chat system.

This filtering method performs filtering separately on different facial component groups. This results in more stable performance when tracking landmark points on facial components such as eyes and mouth. Besides tracking stability, the spatial correlation of facial components in group division is considered. In principle, each facial component group only contains one or several neighboring facial components. As an example, in a thirty four-point shape regression tracker, facial landmark points may be divided into two groups (e.g., landmark points on mouth and the others on eyebrows+eyes+nose).

Geometric similarities may be utilized between the tracked facial landmark point positions in two continuous frames to achieve an importance-driven filtering. Given a facial component group S, let $\{P_T(x_i,y_i)\}_{i=1,\ldots,N}$ and $\{P_{T-1}(x_i,y_i)\}_{i=1,\ldots,N}$ be the tracked landmark point positions at time T and T−1, respective reference point positions $(P_T(X_r,Y_r))$ and $P_{T-1}(X_r,Y_r)$ are properly determined and they are used for measuring geometric similarities. In some examples, the reference point position is computed from the positions of the most stable landmark points among the group. For example, in the thirty four point shape regression tracker, the reference point was chosen as the midpoint of the line segment which connects two inner corner points of eyes and the two corner points of the mouth. To measure the global geometric similarity $\rho$ between $\{P_T(x_i,y_i)\}_{i=1,\ldots,N}$ and $\{P_{T-1}(x_i,y_i)\}_{i=1,\ldots,N}$ the respective sum distance of facial landmark points to the reference point is first computed according to:

$$d_T = \sum_{i=1}^{N} \|P_T(x_i,y_i) - P_T(x_r,y_r)\|,$$

then $\rho$ is computed as $$\rho = \min\left(\frac{d_T}{d_{T-1}}, \frac{d_{T-1}}{d_T}\right)$$

From the above equations, it can be seen that global geometric similarity $\rho$ has a clear physical meaning. When the value of $\rho$ is large, it means that the tracked landmark point positions between two continuous frames show small changes (slight jitter is likely to appear), otherwise the changes are large (temporary drift sometimes may happen). In light of above analysis, the position filtering on landmark points in facial component group S is performed by:

$$P_T(x_i,y_i) = aP_T(x_i,y_i) + (1-a)P_{T-1}(x_i,y_i) \text{ where } 0 \le a \le 1$$

When the value of $\pi$ is less than a given threshold value (e.g., 0.8), the choice of a may be larger than 0.5, implying that the tracked facial landmark point positions in the current frame contribute more portion in the filtered results than those in the previous frame, otherwise the choice of a may be less than 0.5. Therefore, an importance-driven filtering is achieved.

In this method, only the most correlated information tracked in the current frame (at time T) and the previous frame (at time T−1) are used for filtering. That is, this method needs no predication. Facial landmark points are classified into several groups with respect to spatial correlation and tracking stability, and each group is filtered separately. In the filtered results, the contributions of tracked facial landmark point positions in two continuous frames are properly determined by measuring geometric similarities. The filtering is also driven by importance.

Figure 3:
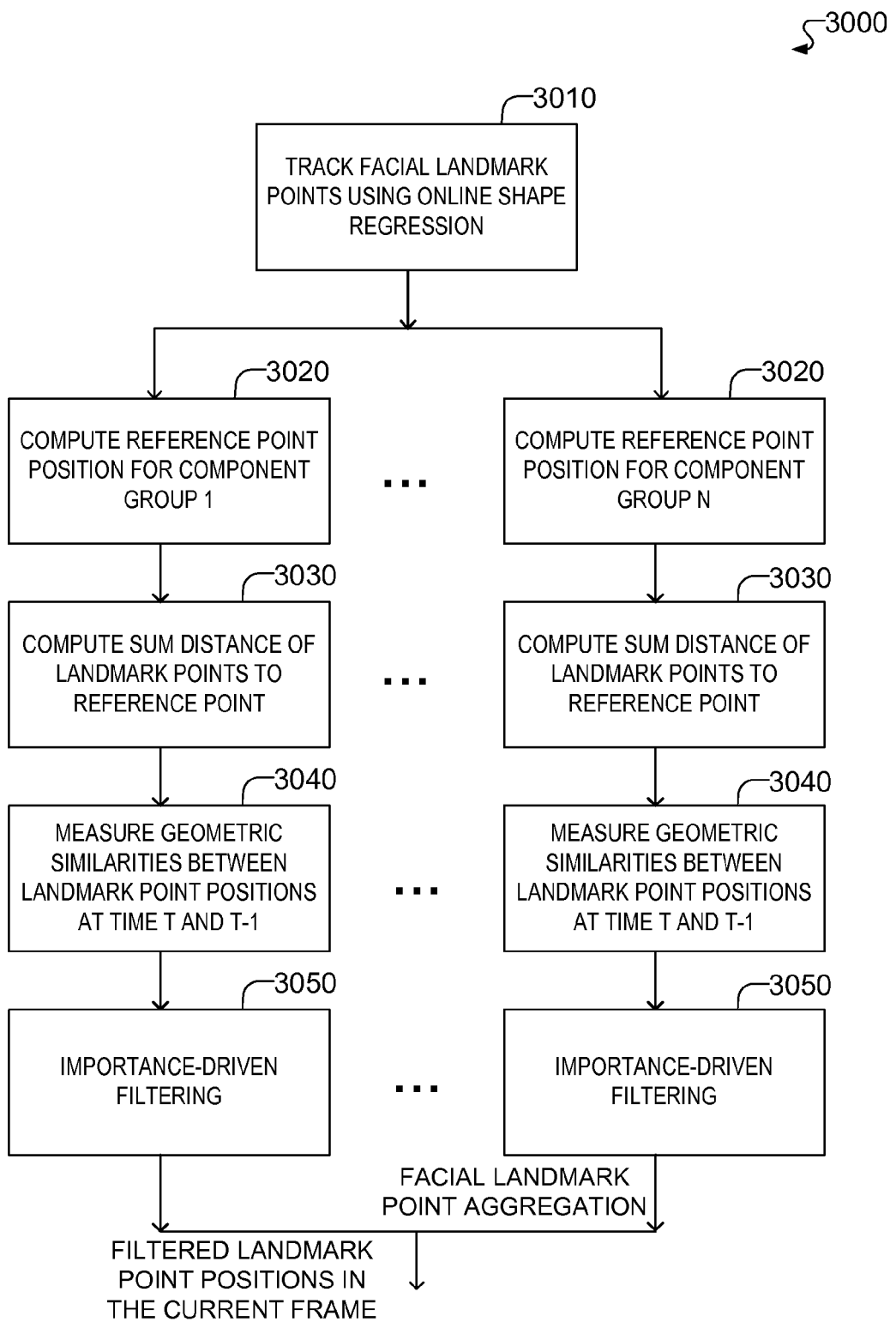
FIG. 3 is a flowchart of a method of facial component based filtering for suppression of slight jitter and temporary drift according to some examples of the present disclosure.

FIG. 3 is a flowchart of a method 3000 of facial component based filtering for suppression of slight jitter and temporary drift according to some examples of the present disclosure. At operation 3010, for the current frame at time T, the facial landmark points are tracked using the online shape regression techniques. At operation 3020, for each component group (e.g., nose, eyes, ears, or the like) the reference point position is calculated. At operation 3030, for each group, the sum distance of landmark points to reference points is calculated. At operation 3040, the geometric similarities between the landmark positions at time T and T−1 are computed. At operation 3050, the importance based filtering is applied, which leads to an output of filtered landmark point positions in the current frame.

Selective Updating and Generalized Fern for Shape Regression

The online shape regression method uses a cascaded regressor to incrementally update a facial shape (a set of facial landmark points) in a coarse-to-fine fashion. However, when training facial shape increments in each primitive regressor, the alignment error associated with training samples falling in one specific bin of a fern (a composition of F features and respective thresholds, where F=5 is used in the traditional model) directly acts on the whole facial shape update without considering the fact that a fern usually only correlates with a limited portion of facial landmark points in a facial shape. Besides, a fern performs a binary partition of training data with respect to each feature and corresponding threshold. That is, using a fern on a large training dataset (e.g., tens of thousands samples) will only obtain a coarse but not dense division of feature space. These drawbacks may directly affect the accuracy of the original method.

To deal with above problems, disclosed are methods, systems, and machine readable mediums which employ selective updating and a generalized fern to improve the accuracy of the original shape regression method. The selective updating introduces a more reliable way to compute facial shape increments in each primitive regressor, avoiding error due to whole facial shape updating. The generalized fern can flexibly perform any level partition of the training dataset. This shape regression approach overcomes the drawbacks of the original method, and works well in real time applications such as an avatar video chat application.

The original shape regression method uses whole facial shape updating which may easily introduce unexpected alignment errors since the fern in each primitive regressor usually only correlates with a limited portion of facial landmark points in facial shape. Besides, dense partition of large training data cannot be obtained since a fern can only perform binary partition with respect to each feature and corresponding threshold in the fern.

The shape regression method disclosed herein not only avoids the above described error by using a selective updating strategy but also perform a sufficiently dense partition of large training dataset by applying a generalized fern. These techniques are quite useful for improving the accuracy of the original method.

The basic framework of explicit shape regression is a two-level cascaded regression. The first level regression additively combines a set of weak regressors $\{S_1, S_2, \ldots, S_T\}$ designed to encode large facial shape variations. In the second level regression, each weak regressor $S_t$ is defined as the additive combination of a set of primitive regressors $\{S_{t1}, S_{t2}, \ldots, S_{tK}\}$ intended to encode minor facial shape variations. Given a face image I and an initial facial shape $S_0$, the final regressed facial shape S may be expressed as:

$$s = S_0 + \sum_{t=1}^{T} \sum_{k=1}^{K} \Delta(S_{tk}, I),$$

where $\Delta(S_{tk}, I)$ denotes the facial shape increment iteratively obtained in the step of running the primitive regressor $S_{tk}$. Given a training dataset, the facial shape increment in the primitive regressor $S_{tk}$ is learned from a fern defined over a composition of F Shape Indexed Image Features (SIIF—the intensity difference of two pixels associated with two landmark points) and respective thresholds. A fern divides the training dataset into $2^F$ bins by a tree based binary comparison. In the original offline shape regression technique, the facial shape increment concerning the $i^{th}$ bin of a fern is estimated as $$\Delta S_{tk}(i) = \frac{\sum_{j \in A_i} (\hat{S}_j - S_j)}{|A_i|}$$

Where $A_i$ denotes the training samples falling in the $i^{th}$ bin, $\hat{S}_j$ and $S_j$ denoting the ground truth facial shape of the $j^{th}$ training sample in $A_i$ and the estimated facial shape in the previous step, respectively. From this equation, it becomes evident that the original method uses whole facial shape updating. However, a fern usually only correlates with a limited portion of facial landmark points in a facial shape (e.g., in the previous offline shape regression model, a fern only contains 5 pixel pairs, thus it correlates with 10 facial landmark points at most). Therefore, unexpected error may be introduced in the estimated facial shape increment $\Delta(S_{tk}, I)$.

In some examples to solve this problem, a technique involving selective updating may be used. In this method, the estimated facial shape increment mainly contains the errors of facial landmark points correlated with the fern. In principle, only the landmark point errors concerning facial components which contain facial landmark points having correlation to the fern are encoded in a facial shape increment. As mentioned above, a fern contains 5 pixel pairs and at most correlates with 10 facial landmark points. That is, only the landmark point errors (calculated from the above equation on facial components which contain facial landmark points used in the fern are reliable. All others are not and may be set to zero.

In this way, we obtain a more accurate cascaded shape regressor. On the other hand, given a SIIF and its threshold, the fern only performs a binary partition of training dataset. However, the intensity difference of two pixels associated with two facial landmark points is likely to fall in multiple intervals due to large variations of training dataset, especially on large training dataset. In this case, more dense partitions of the training dataset are critical for achieving more accurate facial shape increment estimation. To this end, disclosed is a generalized fern which can perform dense partition of training dataset using an SIIF with k thresholds instead of a single threshold (where k>1). Given an SIIF, the values of k thresholds can be easily determined with respect to the distribution of respective intensity difference over training dataset.

In sum, instead of a binary comparison (as in the original method), this method divides the fern using k thresholds. As already noted, in the training process, given an SIIF (correlates a unique facial landmark point pair), the mean intensity value of each facial landmark point over the training dataset is calculated first. If we denote $m_1$ and $m_2$ as the resulting mean values, then the threshold value $t_i$ can be easily computed as $t_i = (m_1 - m_2) * i/K$, where $i = 1, \ldots, K$.

Figure 4:
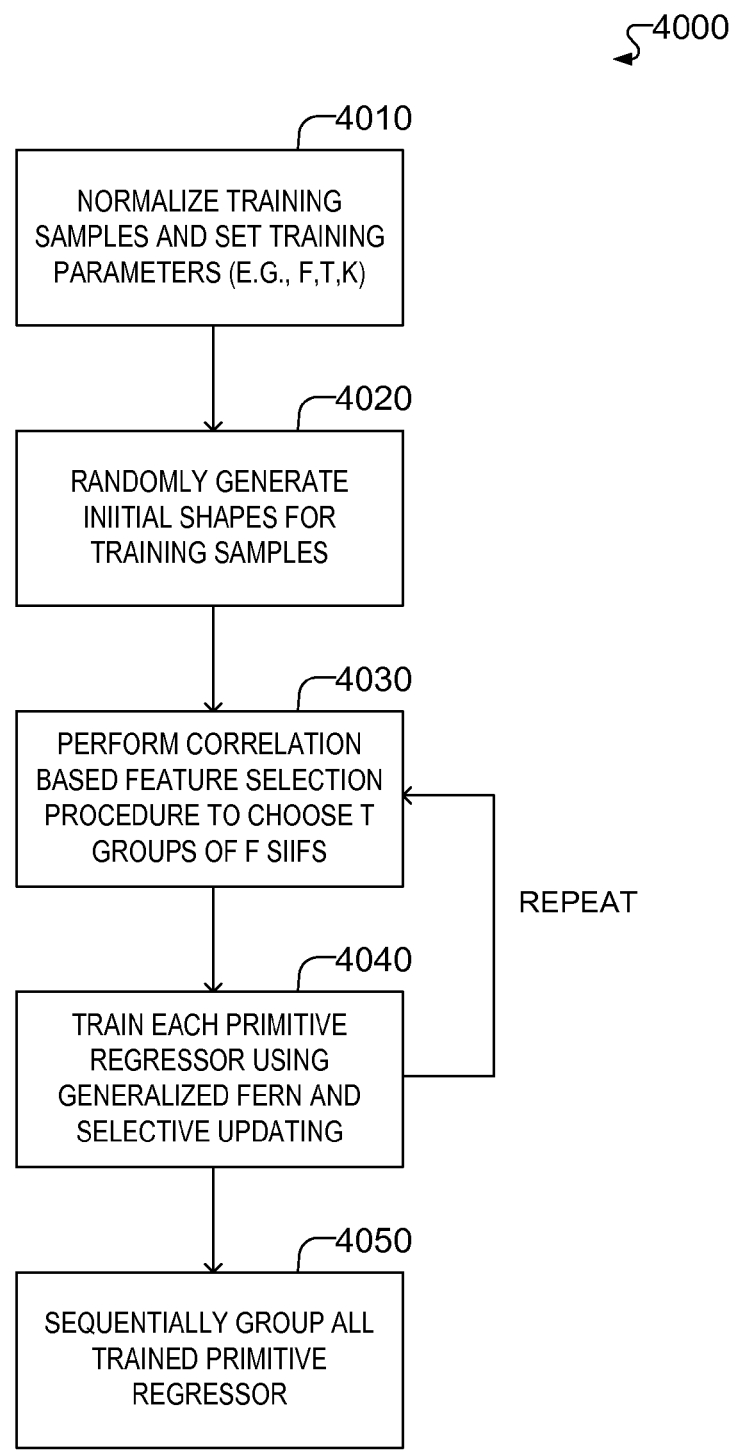
FIG. 4 shows a flowchart of a method of training the shape regressor according to some examples of the present disclosure.

FIG. 4 shows a flowchart of a method 4000 of training the shape regressor according to some examples of the present disclosure. At operation 4010, using the training data comprising face images, respective face bounding boxes and ground truth shapes, the training samples are normalized and the training parameters are set. For example, the values of T and K are set. Example values of T include ten. Example values of K include two hundred fifty six. At operation 4020, the initial shapes are randomly generated for the training samples. At operation 4030, a correlation based feature selection procedure is performed to choose T groups of F SIIFS. At operation 4040, each primitive regressor is trained using the generalized fern and selective updating. Operations 4030 and 4040 are repeated until the number of iterations is equal to T*K. Each group of F SIIFs is used in training K primitive regressors. At operation 4050, all trained primitive regressors are sequentially grouped to obtain the final regressor. Once a final shape regressor is trained, given a face image (where face bounding box is known) and initial facial shape (we choose it as the mean shape over training data), the final shape can be calculated by summing up initial facial shape and each shape increment sequentially obtained from looking up respective primitive regressor.

Figure 5:
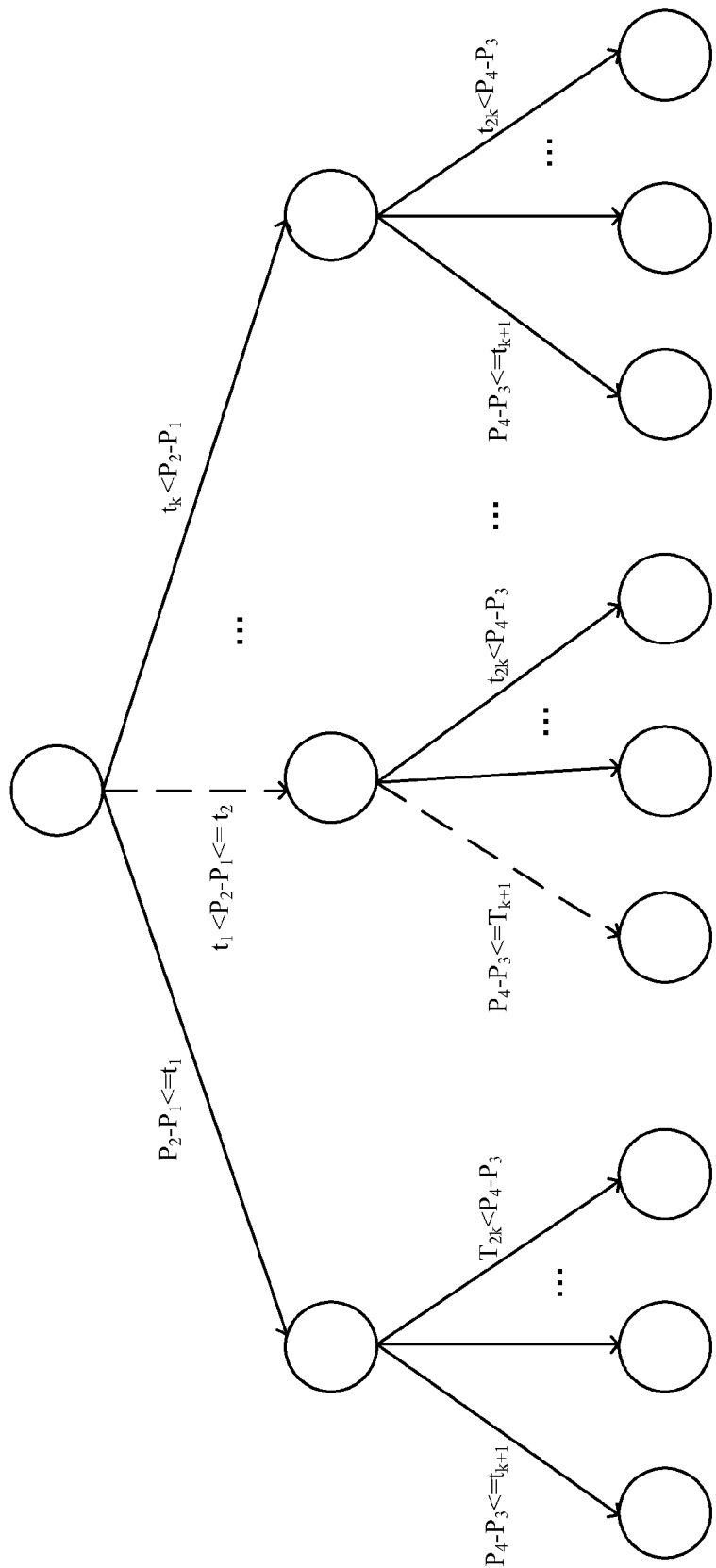
FIG. 5 shows a tree based partition structure of a generalized fern over two SIIFs according to some examples of the present disclosure.

FIG. 5 shows a tree based partition structure of a generalized fern over two SIIFs according to some examples of the present disclosure. Note that any level partition of training dataset can be achieved by changing the value of k. Finally, we obtain an enhanced shape regression method by integrating selective updating and generalized fern into the original method.

Figure 6:
FIG. 6 shows line drawings of representative shape regression results according to some examples of the present disclosure.

In an example application such as an avatar video chat application, a thirty four point shape regressor may be used which is trained on a large dataset containing over 10 k facial shape samples. This shape regressor demonstrates favorable capability to handle partial occlusion, and facial expression/pose/illumination variations. FIG. 6 shows line drawings showing representative shape regression results according to some examples of the present disclosure. These line drawings approximate screen shots of a face, overlaid with the detected tracking points. In FIG. 6, "X" marks are placed over detected facial landmarks.

Data Driven Method for Facial Expression Retargeting

One example implementation of the facial landmark identification is the use of those facial landmarks to simulate an animated model. For example, to animate an avatar. Previous solutions either needed high-quality marker-based visual tracking outputs or used user-specific rules to drive the avatar animation.

Disclosed in some examples are methods, systems, and machine readable mediums which use camera-based, markerless facial tracking techniques to retarget generic user's expressions to an avatar model. This method uses a specially designed data-driven approach to generate stable and high-fidelity facial animation running in real-time. In short, the method utilizes a training dataset and learns a robust mapping from non-semantic tracking parameters into semantic facial expressions, successfully solving the facial motion retargeting problem in avatar animation. In some examples, the system utilizes a dataset that contains typical facial expressions of a group of subjects with different face shapes. This dataset may be used to learn the distance metrics for inter-person differences due to facial shape and intra-person differences due to facial expression. For a new user, his or her specific facial expression basis is estimated at a registration stage, and a blend-shape coefficient is predicted at a facial expression retargeting stage, based on the pre-learned distance metrics.

This approach can produce robust results in generic facial mapping, even in situations where the visual tracking outputs are of low dimension and noisy. Additionally, since most existing solutions are primarily user-rule-specific, this system works reasonably well for a generic user through an easy setup process. The new user needs only a few seconds to register a neutral face in the system. From that point on, the system may mimic the facial motions of the user through an animated avatar.

A supervised metric learning method is utilized to obtain the best linear transform of raw tracking data along with a data-driven model to predict registered user's facial expressions. Additionally, the animator training framework is independent of the underlying facial trackers and visual tracking outputs. It does not require any tracking semantics from a tracking engine because it learns expression semantics through a sampled dataset.

During offline learning the objective is to learn two distance metrics, $M_0$ and $M_1$. $M_0$ is designed for measuring inter-person difference, i.e., distinguishing different subjects while minimizing other factors. In contrast, $M_1$ is designed for measuring intra-person difference, i.e., distinguishing different facial expression while dismissing other variations. To learn $M_0$ and $M_1$, a group of subjects is collected and each of them shows a set of pre-defined facial expressions. We say $P_i^j$ denotes the expression vector of the $i^{th}$ expression of the $j^{th}$ subject in a training dataset. Specially, i=0 is reserved for neutral facial expression. Given this dataset, $P_i^j$, standard metric learning method can be used to derive $M_0$ and $M_1$, for example, we use Linear Discriminant Analysis (LDA) in our implementation. Note $M_0$ will play a role in user registration stage while $M_1$ will play a role in online facial expression retargeting stage.

Figure 7A:
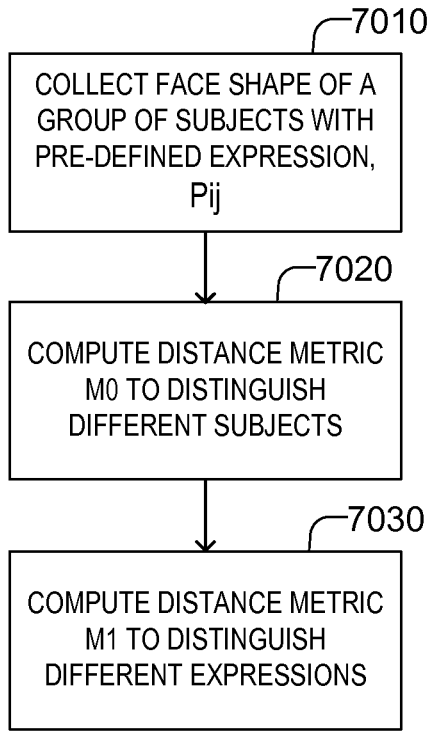
FIG. 7A shows a flowchart of a method describing the offline learning according to some examples of the present disclosure.

Turning now to FIG. 7A, a flowchart of a method describing the offline learning according to some examples of the present disclosure is shown. At operation 7010, face shapes of a group of subjects with a predefined expression are collected. At operation 7020, the distance metric $M_0$ is computed to distinguish different subjects. At operation 7030, the distance metric $M_1$ may be calculated. The metric $M_0$ and $M_1$ can be calculated through supervised distance metric learning method, for example, Linear Discriminant Analysis (LDA).

Prior to animation, a new user may be required to capture his/her neutral face $P^*_0$, and this shape is expected to be expressed as a linear combination of $P_0^j$ within convex constraints, where $P_0^j$ are neutral face shapes in a training set, i.e., $$\min_w \left\| P_0^* - \sum w_j P_0^j \right\|_{M_0} \text{ s.t. } w_j \geq 0, \sum w_j = 1$$

Note this is a constrained quadratic programming (QP) under distance metric $M_0$. Once $w_j$ is solved on registration stage, other facial expression basis for the new user can be predicted as:

$$P^*_i = \Sigma w_j P_i^j$$

In the case of insufficient and low-quality data collection, where $P^*_0$ falls far away from linear space spanned by training examples, the above formula would fail to give reasonable prediction. As alternative solution, Radial Basis Function (RBF) may be used to do the prediction. The RBF basis is given by:

$$\Phi_j(P_0^*) = e^{-\|P_0^* - P_0^j\|^2_{M_0}/2\sigma^2}$$

The RBF regression is performed for each of facial expression basis by utilizing the existing facial shapes in training set. As a result, we derive regression coefficients $w_j^i$, acting on $j^{th}$ RBF basis of $i^{th}$ facial expression basis. The facial expression basis for the new user, $P^*_i$, will be predicated through the RBF regression function:

$$P^*_i = \Sigma w_j^i \Phi(P^*_0)$$

The major advantage of RBF regression over constrained linear regression is that it is more flexible to prepare training dataset. Using the RBF regression framework, the labeled data $P_j^i$ does not need to be coherent, i.e., different expressions could come from different subjects, as long as the neutral expression is included in each subject recording.

Figure 7B:
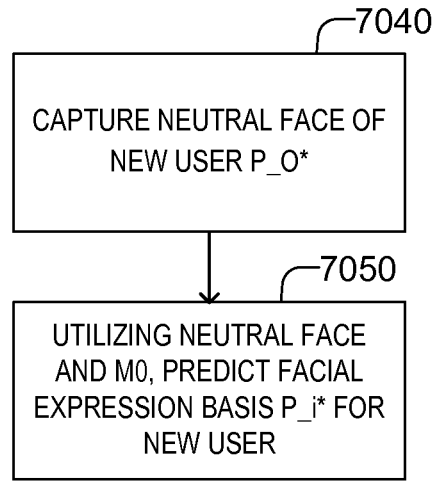
FIG. 7B shows a flowchart of a method of registration according to some examples of the present disclosure.

FIG. 7B shows a flowchart of a method of registration according to some examples of the present disclosure. At operation 7040, the neutral face of the new user is captured. At operation 7050, utilizing this neutral face and $M_0$, the system predicts the facial expression basis for the new user.

Once the system has learned, and the new user is registered, the system can begin online retargeting using a blend-shape animation framework.

$$\min_b \left\| P^* - \sum b_i P_i^* \right\|_{M_1} \text{ s.t. } b_i \geq 0, \sum b_i \leq 1$$

Where $P^*$ is the online visual tracking input from the camera and $b_i$ are blending coefficients acting on the facial expression basis. The blend-shape animation basis $P^*_i$ is pre-defined by artists and a performed animation $P^*$ is expected to be expressed as a linear combination of $P^*$ with constrained blending coefficients $b_i$. The form is still a quadratic programming (QP) form, but subject to a distance metric $M_1$.

Figure 7C:
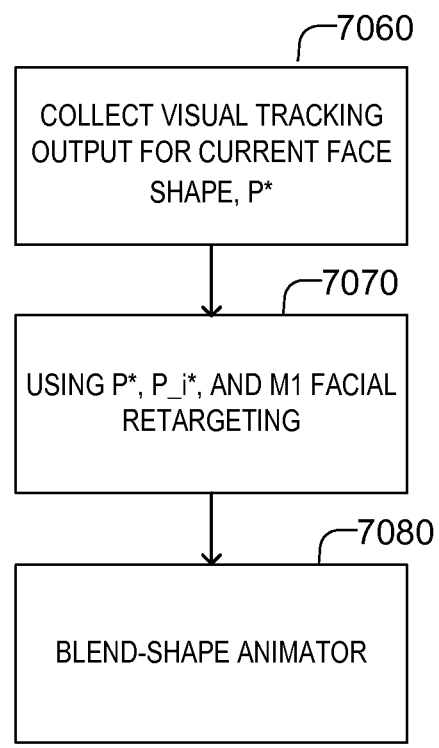
FIG. 7C shows a flowchart of a method of online retargeting according to some examples of the present disclosure.

FIG. 7C shows a flowchart of a method of online retargeting according to some examples of the present disclosure. At operation 7060, the system collects visual tracking output for the current face shape $P^*$. At operation 7070, using $P^*$, $P^*_i$, and $M_1$ the system may perform the facial retargeting using the constrained QP. At operation 7080, the system may perform the online retargeting.

Example System Description

Figure 8:
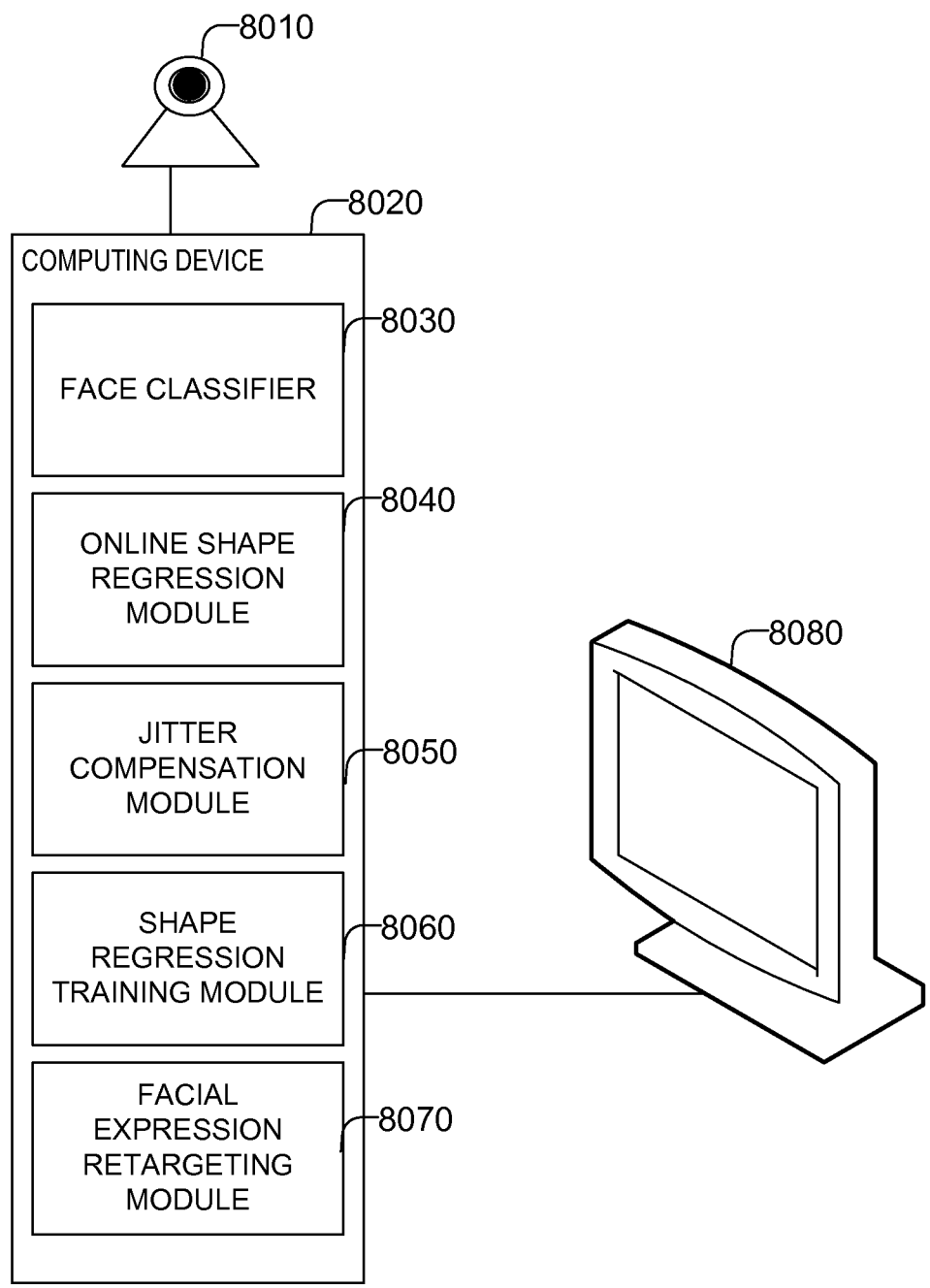
FIG. 8 shows a schematic of an example facial detection system according to some examples of the present disclosure.

FIG. 8 shows a schematic of an example facial detection system according to some examples of the present disclosure. Video of facial images are captured by image capture device 8010. Image capture device 8010 may include a video camera, web camera, or other image capture device. Image capture device 8010 may be integrated with the computing device 8020 or display device 8080, or (as shown) be communicatively coupled to either. Computing device 8020 may be any computing device capable of being configured to execute the methods described herein and example computing devices include a desktop computer, a laptop computer, a tablet computer, a smartphone, a cellphone, a netbook, an Ultrabook™, a hybrid device, or the like. Computing device 8020 may include one or more modules. For example, the computing system may contain a facial classifier module 8030, which may detect a facial region from video frames sent from the video capture device 8010 for using in the online shape regression module 8040. Online shape regression module 8040 may use the facial region to detect facial landmark points in the image using an offline trained shape regressor as previously explained. Jitter compensation module 8050 may compensate for jitter and temporary drift using facial component based filtering techniques discussed earlier. Shape regression training module 8060 may utilize the methods discussed earlier to train the offline shape regression module. Finally, the facial expression retargeting module 8070 may convert the facial landmarks into a representation on the display 8080, such as an animated avatar.

Figure 9:
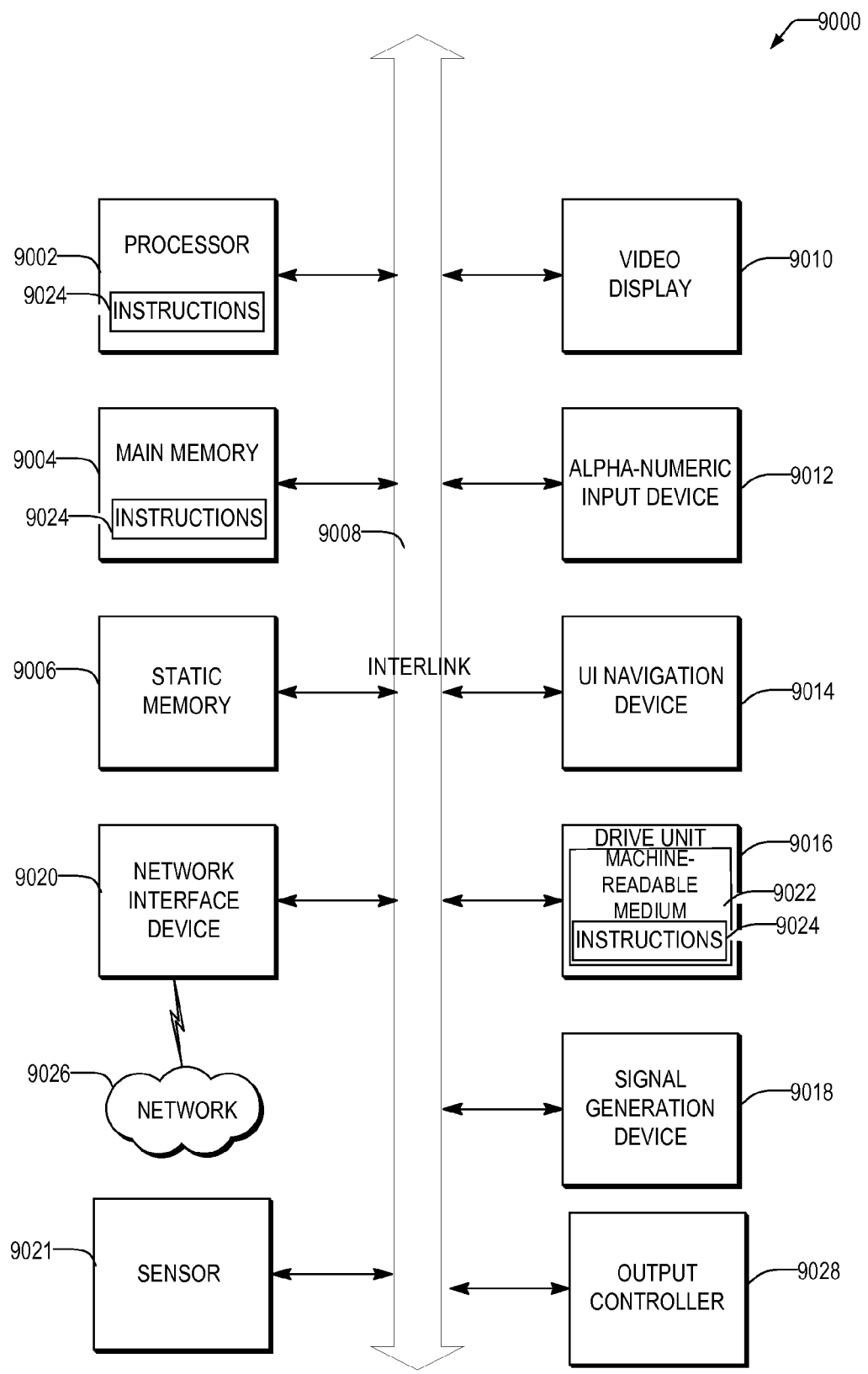
FIG. 9 is a block diagram illustrating an example of a machine upon which one or more embodiments may be implemented according to some examples of the present disclosure.

FIG. 9 illustrates a block diagram of an example machine 9000 upon which any one or more of the techniques (e.g., methodologies) discussed herein may perform. In alternative embodiments, the machine 9000 may operate as a standalone device or may be connected (e.g., networked) to other machines. In a networked deployment, the machine 9000 may operate in the capacity of a server machine, a client machine, or both in server-client network environments. In an example, the machine 9000 may act as a peer machine in peer-to-peer (P2P) (or other distributed) network environment. The machine 9000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 9000 may include a hardware processor 9002 (e.g., a central processing unit (CPU), a graphics processing unit (GPU), a hardware processor core, or any combination thereof), a main memory 9004 and a static memory 9006, some or all of which may communicate with each other via an interlink (e.g., bus) 9008. The machine 9000 may include one or more interlinks and one or more busses in some configurations. The machine 9000 may further include a display unit 9010, an alphanumeric input device 9012 (e.g., a keyboard), and a user interface (UI) navigation device 9014 (e.g., a mouse). In an example, the display unit 9010, input device 9012 and UI navigation device 9014 may be a touch screen display. The machine 9000 may additionally include a storage device (e.g., drive unit) 9016, a signal generation device 9018 (e.g., a speaker), a network interface device 9020, and one or more sensors 9021, such as a global positioning system (GPS) sensor, a digital camera (such as a video camera), compass, accelerometer, or other sensor. The machine 9000 may include an output controller 9028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 9016 may include a machine readable medium 9022 on which is stored one or more sets of data structures or instructions 9024 (e.g., software) embodying or utilized by any one or more of the techniques or functions described herein. The instructions 9024 may also reside, completely or at least partially, within the main memory 9004, within static memory 9006, or within the hardware processor 9002 during execution thereof by the machine 9000. In an example, one or any combination of the hardware processor 9002, the main memory 9004, the static memory 9006, or the storage device 9016 may constitute machine readable media.

While the machine readable medium 9022 is illustrated as a single medium, the term "machine readable medium" may include a single medium or multiple media (e.g., a centralized or distributed database, and/or associated caches and servers) configured to store the one or more instructions 9024.

The term "machine readable medium" may include any medium that is capable of storing, encoding, or carrying instructions for execution by the machine 9000 and that cause the machine 9000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a machine readable medium comprises a machine readable medium with a plurality of particles having resting mass. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 9024 may further be transmitted or received over a communications network 9026 using a transmission medium via the network interface device 9020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 9020 may include one or more physical jacks (e.g., Ethernet, coaxial, or phone jacks) or one or more antennas to connect to the communications network 9026. In an example, the network interface device 9020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 9000, and includes digital or analog communications signals or other intangible medium to facilitate communication of such software.

Other Examples

The following are non-limiting examples.

Example 1 includes subject matter (such as a method, means for performing acts, machine readable medium including instructions for detection of facial landmark points, which when performed by a machine, causes the machine to perform acts, or an apparatus configured to perform) comprising: detecting a facial image in a first video frame using a face classifier; normalizing the detected facial image by applying a first transform to the detected facial image; detecting a set of facial landmark points of the normalized facial image using a trained shape regressor; computing a set of final facial landmark points in the first video frame by applying a second transform to the facial landmark points, the second transform an inverse transform of the first transform.

In example 2, the subject matter of example 1 may optionally include calculating a facial bounding box for a second video frame using the computed set of facial landmark points from the first video frame; normalizing a second facial image in the second video frame by applying a third transform to the second facial image, the second facial image comprising the image of the second video frame within the facial bounding box; detecting a second set of facial landmark points in the normalized second facial image using the trained shape regressor; and computing a set of second final facial landmark points in the second video frame by applying a fourth transform to the facial landmark points, the fourth transform an inverse transform of the third transform In example 3, the subject matter of any of examples 1-2 may optionally include padding the facial bounding box by a predetermined amount.

In example 4, the subject matter of any of examples 1-3 may optionally include for each of two facial component groups: compute a reference point position; compute a sum distance of the set of facial landmark points in the second video frame to the reference point position; measure a geometric similarity between the second set of landmark points in the second video frame and the set of landmark points in the first video frame; and apply an importance driven filtering to produce a jitter compensated set of facial landmark points.

In example 5, the subject matter of any of examples 1-4 may optionally include wherein applying an importance driven filter comprises weighting positions of the landmark points in the first video frame with a first weighting factor and weighting positions of the landmark points in the second video frame with a second weighting factor, and wherein the first and second weighting factors are determined based upon the measured geometric similarity.

In example 6, the subject matter of any of examples 1-5 may optionally include training the trained shape regressor by creating a generalized fern to partition a training dataset with at least two thresholds, wherein the generalized fern is a division of the training dataset based upon pixel intensities.

In example 7, the subject matter of any of examples 1-6 may optionally include animating a graphical avatar using the facial landmark points.

In example 8, the subject matter of any of examples 1-7 may optionally include collecting face shape information for a plurality of subjects, each respective subject in the plurality of subjects emoting a pre-defined expression; computing a first distance metric to described the differences between the plurality of subjects; and computing a second distance metric to describe the differences between different expressions of the plurality of subjects.

In example 9, the subject matter of any of examples 1-8 may optionally include capturing a neutral face of a new user; determining a facial expression basis for the new user using the first distance metric.

In example 10, the subject matter of any of examples 1-9 may optionally include wherein animating the graphical avatar using the facial landmark points comprises calculating a facial retargeting using a blend shape animation formula using the first and second metrics, the set of facial landmark points, and the facial expression basis for the new user as inputs.

In example 11, the subject matter of any of examples 1-10 may optionally include wherein the first transform is a scaling transform.

Example 12 includes or may optionally be combined with the subject matter of any one of Examples 1-11 to include subject matter (such as a device, apparatus, or machine) for detection of facial landmark points, comprising: a facial classifier module to: detect a facial image in a first video frame; and an online shape regression module to: normalize the detected facial image by applying a first transform to the detected facial image; detect a set of facial landmark points of the normalized facial image using a trained shape regressor; compute a set of final facial landmark points in the first video frame by applying a second transform to the facial landmark points, the second transform an inverse transform of the first transform.

In example 13, the subject matter of any of examples 1-12 may optionally include wherein the online shape regression module is to: calculate a facial bounding box for a second video frame using the computed set of facial landmark points from the first video frame; normalize a second facial image in the second video frame by applying a third transform to the second facial image, the second facial image comprising the image of the second video frame within the facial bounding box; detect a second set of facial landmark points in the normalized second facial image using the trained shape regressor; and compute a set of second final facial landmark points in the second video frame by applying a fourth transform to the facial landmark points, the fourth transform an inverse transform of the third transform In example 14, the subject matter of any of examples 1-13 may optionally include wherein the online shape regression module is configured to pad the facial bounding box by a predetermined amount.

In example 15, the subject matter of any of examples 1-14 may optionally include a jitter compensation module to: for each of two facial component groups: compute a reference point position; compute a sum distance of the set of facial landmark points in the second video frame to the reference point position; measure a geometric similarity between the second set of landmark points in the second video frame and the set of landmark points in the first video frame; and apply an importance driven filtering to produce a jitter compensated set of facial landmark points.

In example 16, the subject matter of any of examples 1-15 may optionally include wherein the jitter compensation module is configured to apply an importance driven filter by being configured to at least weight positions of the landmark points in the first video frame with a first weighting factor and weight positions of the landmark points in the second video frame with a second weighting factor, and wherein the first and second weighting factors are determined based upon the measured geometric similarity.

In example 17, the subject matter of any of examples 1-16 may optionally include a shape regression training module to: train the trained shape regressor by creating a generalized fern to partition a training dataset with at least two thresholds, wherein the generalized fern is a division of the training dataset based upon pixel intensities.

In example 18, the subject matter of any of examples 1-17 may optionally include a facial expression retargeting module to animate a graphical avatar using the facial landmark points.

In example 19, the subject matter of any of examples 1-16 may optionally include wherein the facial expression retargeting module is to: collect face shape information for a plurality of subjects, each respective subject in the plurality of subjects emoting a pre-defined expression; compute a first distance metric to described the differences between the plurality of subjects; and compute a second distance metric to describe the differences between different expressions of the plurality of subjects.

In example 20, the subject matter of any of examples 1-19 may optionally include wherein the facial expression retargeting module is configured to: capturing a neutral face of a new user; and determining a facial expression basis for the new user using the first distance metric.

In example 21, the subject matter of any of examples 1-20 may optionally include wherein the facial expression retargeting module is configured to use a blend shape animation formula using the first and second metrics, the set of facial landmark points, and the facial expression basis for the new user as inputs.

In example 22, the subject matter of any of examples 1-21 may optionally include wherein the first transform is a scaling transform.

What is claimed is:

1. A method for detection of facial landmark points, the method comprising:
   detecting a facial image in a first video frame using a face classifier;
   normalizing the detected facial image by applying a first transform to the detected facial image;
   detecting a set of facial landmark points of the normalized facial image using a trained shape regressor;
   computing a set of final facial landmark points in the first video frame by applying a second transform to the facial landmark points, the second transform an inverse transform of the first transform;
   calculating a facial bounding box for a second video frame using the computed set of final facial landmark points from the first video frame;
   normalizing a second facial image in the second video frame by applying a third transform to the second facial image, the second facial image comprising the image of the second video frame within the facial bounding box;
   detecting a second set of facial landmark points in the normalized second facial image using the trained shape regressor; and
   computing a second set of final facial landmark points in the second video frame by applying a fourth transform to the facial landmark points, the fourth transform an inverse transform of the third transform.

2. The method of claim 1, comprising:
   for each of two facial component groups:
     compute a reference point position;
     compute a sum distance of the set of facial landmark points in the second video frame to the reference point position;
     measure a geometric similarity between the second set of landmark points in the second video frame and the set of landmark points in the first video frame; and
     apply an importance driven filtering to produce a jitter compensated set of facial landmark points.

3. The method of claim 2, wherein applying an importance driven filter comprises weighting positions of the landmark points in the first video frame with a first weighting factor and weighting positions of the landmark points in the second video frame with a second weighting factor, and wherein the first and second weighting factors are determined based upon the measured geometric similarity.

4. The method of claim 3, comprising:
   training the trained shape regressor by creating a generalized fern to partition a training dataset with at least two thresholds, wherein the generalized fern is a division of the training dataset based upon pixel intensities.

5. The method of claim 1 comprising:
   animating a graphical avatar using the facial landmark points.

6. The method of claim 5, comprising:
   collecting face shape information for a plurality of subjects, each respective subject in the plurality of subjects emoting a pre-defined expression;
   computing a first distance metric to describe differences between the plurality of subjects; and
   computing a second distance metric to describe differences between different expressions of the plurality of subjects.

7. The method of claim 6, comprising:
   capturing a neutral face of a new user; and
   determining a facial expression basis for the new user using the first distance metric.

8. The method of claim 7, wherein animating the graphical avatar using the facial landmark points comprises calculating a facial retargeting using a blend shape animation formula using the first and second distance metrics, the set of facial landmark points, and the facial expression basis for the new user as inputs.

9. A device for detection of facial landmark points, the device comprising:
one or more processors arranged to execute at least:
a facial classifier module to:
detect a facial image in a first video frame; and
an online shape regression module to:
normalize the detected facial image by applying a first transform to the detected facial image;
detect a set of facial landmark points of the normalized facial image using a trained shape regressor;
compute a set of final facial landmark points in the first video frame by applying a second transform to the facial landmark points, the second transform a reverse transform of the first transform;
calculate a facial bounding box for a second video frame using the computed set of final facial landmark points from the first video frame;
normalize a second facial image in the second video frame by applying a third transform to the second facial image, the second facial image comprising the image of the second video frame within the facial bounding box;
detect a second set of facial landmark points in the normalized second facial image using the trained shape regressor; and
compute a second set of final facial landmark points in the second video frame by applying a fourth transform to the facial landmark points, the fourth transform an inverse transform of the third transform.

10. The device of claim 9, wherein the online shape regression module is to pad the facial bounding box by a predetermined amount.

11. The device of claim 9, comprising:
a jitter compensation module to:
for each of two facial component groups:
compute a reference point position;
compute a sum distance of the set of facial landmark points in the second video frame to the reference point position;
measure a geometric similarity between the second set of landmark points in the second video frame and the set of landmark points in the first video frame; and
apply an importance driven filtering to produce a jitter compensated set of facial landmark points.

12. The device of claim 11, wherein the jitter compensation module is to apply an importance driven filter by being configured to at least weight positions of the landmark points in the first video frame with a first weighting factor and weight positions of the landmark points in the second video frame with a second weighting factor, and wherein the first and second weighting factors are determined based upon the measured geometric similarity.

13. The device of claim 12, comprising:
a shape regression training module to:
train the trained shape regressor by creating a generalized fern to partition a training dataset with at least two thresholds, wherein the fern is a division of the training dataset based upon pixel intensities.

14. The device of claim 9 comprising:
a facial expression retargeting module to animate a graphical avatar using the facial landmark points.

15. A non-transitory machine readable medium for detection of facial landmark points, the machine readable medium storing instructions, which when performed by a machine, cause the machine to perform operations comprising:
detecting a facial image in a first video frame using a face classifier;
normalizing the detected facial image by applying a first transform to the detected facial image;
detecting a set of facial landmark points of the normalized facial image using a trained shape regressor; and
computing a set of final facial landmark points in the first video frame by applying a second transform to the facial landmark points, the second transform an inverse transform of the first transform;
calculating a facial bounding box for a second video frame using the computed set of final facial landmark points from the first video frame;
normalizing a second facial image in the second video frame by applying a third transform to the second facial image, the second facial image comprising the image of the second video frame within the facial bounding box;
detecting a second set of facial landmark points in the normalized second facial image using the trained shape regressor; and
computing a second set of final facial landmark points in the second video frame by applying a fourth transform to the facial landmark points, the fourth transform an inverse transform of the third transform.

16. The non-transitory machine readable medium of claim 15, wherein the instructions include instructions, which when performed by the machine, cause the machine to perform the operations comprising:
padding the facial bounding box by a predetermined amount.

17. The non-transitory machine readable medium of claim 15, wherein the instructions include instructions, which when performed by the machine, cause the machine to perform the operations comprising:
for each of two facial component groups:
compute a reference point position;
compute a sum distance of the set of facial landmark points in the second video frame to the reference point position;
measure a geometric similarity between the second set of landmark points in the second video frame and the set of landmark points in the first video frame; and
apply an importance driven filtering to produce a jitter compensated set of facial landmark points.

18. The non-transitory machine readable medium of claim 17, wherein the instructions for applying an importance driven filter comprises instructions, which when performed by the machine, cause the machine to perform operations comprising: weighting positions of the landmark points in the first video frame with a first weighting factor and weighting positions of the landmark points in the second video frame with a second weighting factor, and wherein the first and second weighting factors are determined based upon the measured geometric similarity.

19. The non-transitory machine readable medium of claim 18, wherein the instructions include instructions, which when performed by the machine, cause the machine to perform the operations comprising:
training the trained shape regressor by creating a generalized fern to partition a training dataset with at least two thresholds, wherein the fern is a division of the training dataset based upon pixel intensities.

20. The non-transitory machine readable medium of claim 15 wherein the instructions include instructions, which when performed by the machine, cause the machine to perform the operations comprising:

animating a graphical avatar using the facial landmark points.

21. The non-transitory machine readable medium of claim 20, wherein the instructions include instructions, which when performed by the machine, cause the machine to perform the operations comprising:
- collecting face shape information for a plurality of subjects, each respective subject in the plurality of subjects emoting a pre-defined expression;
- computing a first distance metric to describe differences between the plurality of subjects;
- computing a second distance metric to describe differences between different expressions of the plurality of subjects;
- capturing a neutral face of a new user; and
- determining a facial expression basis for the new user using the first distance metric; and
- wherein the instructions for animating the graphical avatar using the facial landmark points comprise instructions, which when performed by the machine, cause the machine to perform operations of calculating a facial retargeting using a blend shape animation formula using the first and second distance metrics, the set of facial landmark points, and the facial expression basis for the new user as inputs.

22. The non-transitory machine readable medium of claim 15, wherein the first transform is a scaling transform.

* * * * *